Jan. 13, 1931.    O. F. RUSSELL    1,788,596
PLUMBING FITTING
Filed June 13, 1927
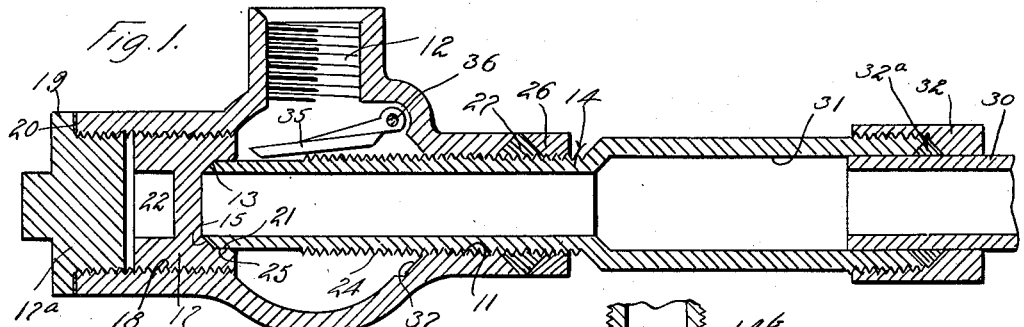
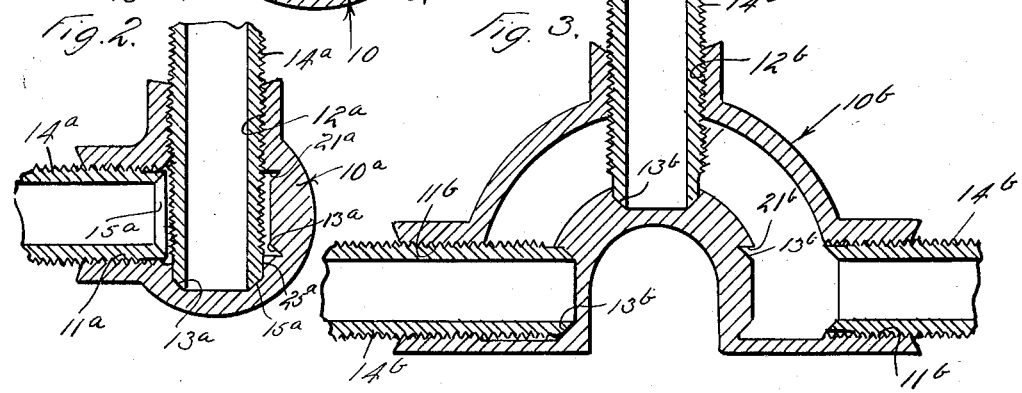
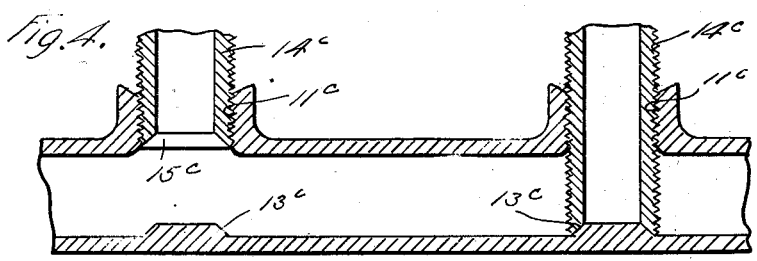
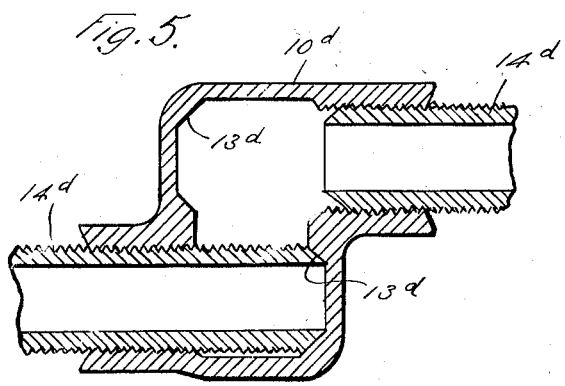
Inventor
Olin F. Russell
by *his Attorney*

Patented Jan. 13, 1931

1,788,596

UNITED STATES PATENT OFFICE

OLIN F. RUSSELL, OF LOS ANGELES, CALIFORNIA

PLUMBING FITTING

Application filed June 13, 1927. Serial No. 198,362.

This invention has to do with a plumbing fixture or fitting useful, generally, in pipe lines, and it is a primary object of the invention to provide a simple, practical and effective fitting which acts as a coupling or connection between adjoining pipes and is operable to stop or cut off flow through the pipes.

It is a primary object of my present invention to provide a plumbing fitting of the character mentioned which is practical and effective and, at the same time, simple and inexpensive of manufacture.

It is another object of my invention to provide a fitting of the character mentioned embodying auxiliary valve means whereby the device acts as a check valve when in operating position in a pipe line.

It is a further object of this invention to provide a fitting of the character mentioned involving few simple and inexpensive parts.

The invention is capable of embodiment in numerous forms or detailed arrangements to suit a large variety of conditions, such as are encountered in pipe fitting and, to give an understanding of some of the possible variations of the invention, I have set forth in the accompanying drawings several different modifications or embodiments of the invention.

The various objects and features of the invention will be best and more fully understood from the following detailed description of typical forms and applications of the invention, throughout which description reference is had to the accompanying drawings, in which:

Fig. 1 is a detailed, sectional view of a typical construction embodying the various features provided by my invention;

Fig. 2 is a detailed, sectional view of another simple form of construction embodying the invention;

Fig. 3 is a detailed, sectional view of another form or embodiment of the invention;

Fig. 4 is a detailed, sectional view of another form of the invention; and

Fig. 5 is a detailed, sectional view of another form of the invention.

My invention provides primarily a pipe line attachment or fitting including, generally, a body 10 having an inlet opening 11, an outlet opening 12 and a seat 13 opposite the inlet opening, and a threaded coupling member 14 in the form of a nipple screwthreaded to the body to extend into the body through the inlet opening 11 and having a valve face 15 provided at its inner end to cooperate with the seat 13.

Referring in particular to Fig. 1 of the drawings, the body 10 is designed so that the inlet opening 11 and outlet opening 12 are at right angles to each other. The openings 11 and 12 are provided with threads, the threads in the opening 11 being adapted to receive the coupling member 14 and the threads in the opening 12 being adapted to receive a pipe, or the like. In this particular form of the invention, the body is provided with a detachable seat member 17 screwthreaded into an opening 18 in the body opposite the opening 11 to form a wall opposite the opening 11. The seat member 17 is provided at its inner end with a cylindrical socket portion 21 at the inner end of which is a beveled seat 13. In the particular construction shown in the drawings, the outer end of the seat member 17 is provided with a socket 22 polygonal in cross sectional configuration to receive a suitable wrench, or the like. The seat member is concealed by a plug 17a arranged in the outer part of the opening 18. In practice, a washer is preferably inserted between the head 19 of the plug and shoulder 20, making a fluid tight connection between the plug and main part of the body.

The coupling member 14 is more or less in the form of a nipple in that it is provided with a comparatively long screwthreaded portion 24 fitting the threads in the opening 11 so that it is can be operated in the opening into and out of position where the face 15 at its inner end cooperates with the seat 13. The coupling member is provided at its inner end with a turned or finished part 25 which slidably fits the socket 21, making a sealing engagement between the body and member in addition to the sealing engagement obtained between the face and seat. In practice, it is desirable to provide a packing nut 26 on the threaded part 24 adjacent the end of the body whereby packing 27 can be compressed to prevent leakage of fluid between the coupling 14 and the body. In this form of the invention, the outer end of the coupling member 14 is adapted to make a sliding connection with a pipe 30 and, for this purpose, has the opening 31 in its outer end finished to slidably receive the end portion of the pipe. A packing nut 32 is preferably screwthreaded onto the outer end portion of the coupling 14 so that it is operable to compress packing 32ᵃ around the pipe 30 at the outer end of the coupling to prevent leakage of fluid between the coupling and pipe. With the arrangement just described, the coupling 14 can be actuated to move the face 15 into and out of cooperative engagement with the seat 13, thus opening and closing the inner end of the coupling member, at the same time maintaining connection with the pipe 30. When the coupling 14 is in open position, that is, when it is backed away from the seat 13 and cylindrical part 21, fluid can pass through the coupling member and the body 10 between the pipe 30 and pipe arranged in the opening 12. It is to be understood, of course, that the flow may be in either direction through the device.

In accordance with my invention, I may provide an auxiliary valve 35 in the form of a check valve in the body 10, operable to check flow of fluid through the body in one direction. In the particular arrangement shown in the drawings, the check valve 35 is mounted in the body on a pivot pin 36 to cooperate with a seat 37 formed in the body at the inner end of the opening 11. When the coupling 14 is backed away from the seat 13 until it is moved outwardly past the seat 37, the valve 35 is free to act as a check valve to prevent passage of fluid outwardly through the opening 11. It will be obvious that the valve 35 is automatically lifted out of operating position as the coupling 14 is moved inwardly through the body to the closed position.

In Fig. 2 of the drawings, I illustrate a more simple form of the invention in which the body 10a resembles, more or less, an ordinary L or elbow fitting having openings 11a and 12a arranged at right angles to each other. The interior walls of the body 10a opposite the openings 11a and 12a are provided with seats 13a to receive faces 15a provided on the inner ends of coupling members 14a screwthreaded in the openings 11a and 12a. In this construction, cylindrical socket parts 21a may be provided in the body to receive finished parts 25a at the inner ends of the coupling members 14a. The coupling members 14a in this case may be of any suitable construction. For example, I will consider them similar, generally, to the coupling member 14 above described. With this form of the invention, either one of the coupling member 14a may be arranged in closed position, while the other coupling member is open, or both coupling members may be in open position. In the drawings, I have shown one coupling member in closed position and the other coupling member in open position.

In Fig. 3 of the drawings, I have shown another embodiment of the invention, in which case the body 10b is made more or less in the form of a cross-over fitting having openings 11b at its ends and an open opening 12b intermediate its ends. The body 10b in this case is semi-circular in its general configuration. The openings 11b at the ends of the body extend radially or in diametrically opposite directions so that they are co-axial, while the opening 12b, as shown in the drawings, is in the middle portion of the body extending radially with reference to the axis of the body. With this arrangement, it will be obvious that the body presents a wall opposite each opening. The walls of the body opposite the openings may be provided with seats 13b and, if desired, with sockets 21b, as described in the case of the other forms of the invention.

Coupling members 14b, similar to those above described, may be operated in the openings, as will be obvious from the drawings.

In Fig. 4 of the drawings, I illustrate another embodiment of the invention in which the body is an elongate member more or less in the nature of a header. The body has a plurality of lateral openings 11c and the walls of the body opposite the openings are provided with seats 13c to cooperate with faces 15c on the ends of coupling members 14c that may be arranged in the openings.

The form of the invention illustrated in Fig. 5 of the drawings is similar, generally, to that shown in Fig. 2 of the drawings, except that the two openings in the body 10ᵈ are arranged differently. In this particular case, the openings are parallel but offset so that the body 10ᵈ presents interior walls opposite the openings suitable for the provision of the necessary seats 13d.

From the foregoing description of the various forms of the invention, it will be obvious that the openings in the body may be arranged in any desired relation, and it will be apparent how the device can be easily and cheaply manufactured. In operation, the device may be used as an ordinary pipe fitting or coupling to join two adjacent pipes and, whenever necessary, it can be manipulated to shut off the flow through the pipes. In general, the device may be used in the place of a shut-off valve, and is of practical merit in that it accomplishes the general function of a shut-off valve without involving the structural complications of such a device and without occupying the space necessary for an ordinary shut-off valve.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A plumbing fitting including a body having two spaced openings and having an integral closed wall opposite one of said openings, said wall having a valve seat and a cylindrical recess at the seat, and a member extending into the body through said opening and having a valve face to cooperate with the seat and a finished part to seat in the recess to make a seal.

2. A plumbing fitting including a body having two spaced openings and having an integral closed wall opposite one of said openings, said wall having a beveled seat and a cylindrical recess at the seat, and a member extending into the body through said opening and having a valve face to cooperate with the seat and a finished part to seat in the recess.

3. A plumbing fitting including a body having two spaced openings and having an integral closed wall opposite one of said openings, said wall having a valve seat and a cylindrical recess at the seat concentric with said opening, and a member extending into the body through said opening and having a valve face to cooperate with the seat and a finished part to seat in the recess to make a seal.

4. A plumbing fitting including a body having two spaced openings and having a closed wall opposite one of the openings, said wall having a seat, and a member extending into the body through said opening and having a valve face to cooperate with the seat, the outer end of said member being finished to slidably receive a pipe.

5. A plumbing fitting including a body having two spaced openings and having a closed wall opposite one of the openings, said wall having a seat, a member extending into the body through said opening and having a valve face to cooperate with the seat, the outer end of said member being finished to slidably receive a pipe, and means at the outer end of said member for packing between said member and a pipe extending into it.

6. A plumbing fitting including a body having two spaced openings and having a closed wall opposite one of the openings, said wall having a seat, a member extending into the body through said opening and having a valve face to cooperate with the seat, the outer end of said member being finished to slidably receive a pipe, means for packing between said member and the body, and means at the outer end of said member for packing between said member and a pipe extending into it.

In witness that I claim the foregoing I have hereunto subscribed my name this 25th day of May, 1927.

OLIN F. RUSSELL.